United States Patent [19]

Krause

[11] 4,418,889

[45] Dec. 6, 1983

[54] FIRE SAFE SEAT FOR A VALVE

[75] Inventor: Bernd Krause, Cincinnati, Ohio

[73] Assignee: Xomox Corporation, Cincinnati, Ohio

[21] Appl. No.: 244,091

[22] Filed: Mar. 16, 1981

[51] Int. Cl.³ .............................................. F16K 1/22
[52] U.S. Cl. ...................................... 251/306; 137/72; 137/74; 251/173; 251/174; 251/317; 251/307
[58] Field of Search ................... 137/72, 74; 251/306, 251/307, 173, 174, 317

[56] References Cited

U.S. PATENT DOCUMENTS

| | | | |
|---|---|---|---|
| 2,696,697 | 12/1954 | Wilson | 251/174 |
| 3,153,427 | 10/1964 | Burtis | 251/174 X |
| 3,608,861 | 9/1971 | Helman | 251/306 X |
| 3,734,457 | 5/1973 | Rods | 251/173 |
| 4,231,546 | 11/1980 | Eggleston | 251/306 X |
| 4,341,233 | 7/1982 | Broadway | 137/72 |

Primary Examiner—Harold W. Weakley
Attorney, Agent, or Firm—Kinney and Schenk

[57] ABSTRACT

A novel seat especially adapted for a butterfly valve is provided which is formed both of metal and "soft" material so as to furnish a "bubble tight" seal in normal operating conditions and a metal-to-metal seal in fire situations. The seat is uniquely constructed and is permanently deformed by the disc or closure member of the valve to form a precise size and configuration corresponding to the size and configuration of the disc.

22 Claims, 4 Drawing Figures

FIRE SAFE SEAT FOR A VALVE

BACKGROUND

The present invention relates generally to valves and more particularly concerns a valve with a seat which will maintain its sealing relationship with a closure member of the valve under extreme heat condition that may, for example, result from a fire. The invention will be specifically disclosed in connection with a high performance butterfly valve with a seat of both metal and "soft" material construction.

When flammable liquids are used in a piping system, it is highly desirable to use a valve in that system which will maintain a sealing relationship between the valve body and a valve closure member under the extreme heat conditions that may result from a fire. When flammable liquids are used, the reasons for this objective are obvious and in many situations mandatory, for loss of a sealing relationship between the valve body and its closure member may result in a situation in which the flammable liquid travels past the valve to feed the fire. If such leakage were to occur in a fire situation, a catastrophe might result.

Despite the obvious desirability of such a valve, the prior are is devoid of totally successful fire-proof valve seats. The absence of totally successful prior art fire-proof valve seats may be attributable to the often contradictory and inconsistent requirements that are inherently placed on such valve seats. On the one hand, the seats must be effective during normal operation in which no fire is present, for it must be remembered that in most circumstances, the valve will not be subjected to fire or other ultra high temperature conditions. In normal operation, it is desirable to have what is known in the art as "bubble tight" shut-off at the valve and at the interface between the valve body and the closure member in particular. This leak tight or "bubble tight" seal can usually only be accomplished with a plastic or rubber-like valve seat. Unfortunately, plastic and rubber-like materials which perform satisfactorily as valve seats in normal operation tend to deteriorate and vaporize under the ultra high temperatures of a fire. Further, as suggested above, when a plastic or rubber-like seat material deteriorates or vaporizes, the sealing relationship may be lost and a flammable fluid may be leaked past the valve and permitted to feed any existing fire.

In recognition of the problems and limitations of plastic and rubber-like seat materials, many in the prior art have utilized metal seats which provides metal-to-metal sealing relationships with the valve closure members. Metal seats have proved particularly advantageous in fire situations as they operate much more satisfactory in an ultra high temperature environment. While much more effective under fire conditions, metal valve seats are unfortunately much less effective in normal temperature operation. The prior art has not yet, according to applicant's knowledge, provided a metal valve seat that provides "bubble tight" sealing. Further, metal valve seats often interact with valve closure members on an interference principle. When such is the case, extremely high operating torques are frequently required to move the valve closure member from its closed and sealed relationship with the valve body.

One method of overcoming the limitations of both plastic and rubber-like material seats on one hand and metal seats on the other hand, has been to use both of the materials, the plastic or rubber-like material being used to provide "bubble tight" seal during normal temperature operation and the metal seat material being used to provide a seal during ultra high temperature or fire conditions.

Exemplary of the prior art valve seats using both metal and plastic or rubber-like materials is the valve seat disclosed in U.S. Pat. No. 4,113,268. The valve seat disclosed in this mentioned patent uses a metal sealing ring with a plastic or rubber insert and a backing ring formed of rubber or other elastomeric material. The plastic or resilient insert is used to provide a "bubble tight" seal, and the metal sealing ring is used to maintain a seal (although not a "bubble tight" seal) in the event of destruction or deterioration of the plastic or resilient insert, which plastic or resilient insert serves as the primary seat in normal operation. Although a valve seat of this type may be successful in many applications, it is not without attendant disadvantages. For example, the backing ring of this design is normally formed of synthetic rubber and must necessarily be formed of an elastomeric material. One of the major problems of this type of design is that a backing ring formed of rubber or other material having the requisite properties does not necessarily function in all types of media. Like rubber and synthetic rubber, most of the other commonly used materials that exhibit the elastomeric properties necessary for successful operation of such a backing ring are subject to chemical attack by the many fluid medias. Consequently, the backing ring material must be media matched. Otherwise, the media may chemically attack and destroy the backing ring material. For example, if a synthetic rubber material were used with a hydrocarbon media, the hydrocarbon media would chemically attack the synthetic rubber material, destroying the backup ring. Leakage behind the valve seat would then result. Moreover, the operational requirements of this backup ring prohibit the use of fluorinated hydrocarbon polymeric materials, materials which are chemically inert to virtually all process fluids. A backing ring of the type disclosed in the above mentioned U.S. Pat. No. 4,113,268 formed of polytetrafluoroethylene, for example, would permanently deform or "cold flow" under pressure and would allow media leakage past the closed valve.

The necessity of media matching also has disadvantages relating to inventory supplies and increases the possibility that an improper backing ring material may inadvertently be used for a given media. It is thus highly desirable to use materials that have a broad range of application, materials that give the valve a general purpose character.

Another type of valve seat which uses a combination of metal and plastic or rubber-like materials uses a resilient metal seat material which is biased to a position avoiding contact with the valve closure member when the closure member is in the closed position. This metal seat is so biased by a soft seat material of plastic or rubber-like material which sealingly engages the valve closure member when that valve closure member is in the closed position. When subjected to a fire, the plastic rubber-like material is vaporized and the resilient force of the metal seat moves that metal seat into sealing relationship with the valve closure member.

The resiliently biased metal type seat described above has a disadvantage of permitting excessive leakage when the soft seat material is not completely destroyed or during the transition period between the sealing engagement of the plastic or rubber-like seat with the closure member and sealing engagement of the metal seat with the same closure member after destruction of the soft seat. In other words, when the plastic or rubber-like seat is only partially disintegrated, the remnants or segments of the plastic or rubber-like seat material not fully disintegrated will hold the metal seat in its non-contacting, non-sealing relationship with the closure member. This same partial disintegration of the plastic or rubber-like seat material results in a loss of sealing relationship between this soft material and the valve closure member so that neither the metal nor the soft material maintains a sealing relationship, resulting in excessive leakage past the valve.

It is therefore an object of the present invention to provide a valve seat which provides a "bubble tight" seal under normal operating condition and which also maintains a seal under the ultra high temperature conditions of a fire.

It is a further object of the present invention to provide a general purpose valve seat formed of materials suitable for use with a broad range of medias.

It is yet another object of the present invention to provide a valve seat which provides an improved sealing relationship between a metal seat component and a valve closure member.

It is still another object of the present invention to provide a valve seat with a metal component in sealing contact with a valve closure member with low torque requirements for moving the closure member out of the closed position.

It is a still further object of the present invention to provide a valve seat which is custom formed to the size and configuration of a particular closure member with which the seat will be used.

It is a still further object of the present invention to permanently deform a metal valve seat to a size and configuration which precisely matches the size and configuration of the valve closure member.

Yet another object of the present invention is to provide a bidirectional valve seat for a butterfly valve which maintains its contact with a closure disc as the disc is subjected to fluid pressures from either axial side of the disc.

SUMMARY OF THE INVENTION

In accordance with one aspect of the present invention, a fire-safe valve especially designed for use with flammable fluids is provided. The fire-safe valve includes a valve body with a centrally disposed bore into which a closure member is movably mounted. The closure member is movable between open and closed positions about an axis substantially transverse to the bore and has a peripheral sealing surface. An annular recess circumscribes the bore and is in radial alignment with the peripheral sealing surface of the closure member when the closure member is in the closed position. The valve has a novel seat member supported in the annular recess, the seat member being adapted to selectively interface with the sealing surface of the closure member. The seat member extends radially inward into the bore. It includes an annular metal flange extending radially inward from the secured to the valve body. A metal seat ring extends radially inward from the metal flange and has an axial dimension substantially greater than the corresponding axial dimension of the metal flange. The metal seat ring includes a pair of radially extending axial sidewalls which as least partially define an annular flanged groove within the seat ring. The end surfaces of the groove defining sidewalls are axially converged toward the groove, which groove contains an annular sealing surface formed of material softer than that of the metal of the metal seat ring. The sealing surface of the softer material extends radially beyond the radial extension of the metal seat ring and is resiliently deformable radially to a position corresponding to the radial extension of the metal seat ring when subjected to an interface force with the closure member.

In accordance to another important aspect of the present invention, the radial end surfaces of the seat member, and the axial sidewalls of the preferred form of the invention in particular, has been radially stretched and permanently deformed by the closure member to a size in configuration corresponding to the size and configuration of that closure member. In the preferred embodiment the metal flange and metal seat ring are formed of a stainless steel or a nickel alloy and the softer sealing material is formed of a fluorinated hydrocarbon polymeric material such as polytetrafluoroethylene. Preferably, the metal flange is compressingly engaged upon its radially outermost portion between the valve body and a seat retainer which is releasably secured to the valve body.

In accordance to another aspect of the invention, the seat member is supported in the annular recess of the valve in a cantilever type fashion extending radially inward between two axial sidewalls. One of the axial sidewalls is in contacting relationship with the seat member while the other axial sidewall is axially spaced from the seat member while the seat member is in a free state. The seat member is axially flexible only toward the axially spaced sidewall.

In accordance to yet another aspect of the invention, the seat member of the valve has a flange with an annular notch positioned intermediate of the clamping area and a seat ring. The annular notch serves to concentrate any axial flexure of the seat at the notch location.

A still further aspect of the present invention involves an annular radial alignment gap positioned between the radial end of the seat member and either the valve body or a seat retainer. The seat member is radially shiftable within the bore by virtue of the radial alignment gap during assembly.

A still further aspective of the invention relates to a method of sizing a butterfly valve seat to a closure disc. The method includes placing a metal valve seat of annular configuration with a smaller radial dimension than the butterfly valve disc in a seat receptive grove of the valve while the disc is in an open position. A seat retainer is then fastened to the valve body to secure the valve seat in the seat groove, the retainer being placed in contacting relationship against one axial side of the seat so as to prevent axial flexure of the seat in that direction. The valve disc is then closed and the seat is permanently deformed by the interface force of the disc, resulting in a sealing surface on the seat for interfacing with the disc in operation.

A still further method of the present invention involves placing the disc of a butterfly valve in a closed position. A metal valve seat with smaller radial dimension than the valve disc is then placed against the disc in concentric relationship thereto adjacent a seat receptive groove of the valve. A seat retainer is then placed against the seat and axially advanced into the disc to permanently deform the seat by the interface force with the disc. This method results in a formation of a sealing surface on the seat for interfacing with the disc.

BRIEF DESCRIPTION OF THE DRAWINGS

Other objects and advantages of the invention will be apparent upon reading the following detailed description and upon reference to the drawings, in which.

While the invention will be described in connection with the preferred embodiment and procedure, it will be understood that it is not intended to limit the invention to that embodiment or procedure. On the contrary, it is intended to cover all alternatives, modifications and equivalents as may be included within the spirit and scope of the invention as defined by the appended claims.

DETAILED DESCRIPTION OF THE PREFERRED EMBODIMENT

Figure 1:
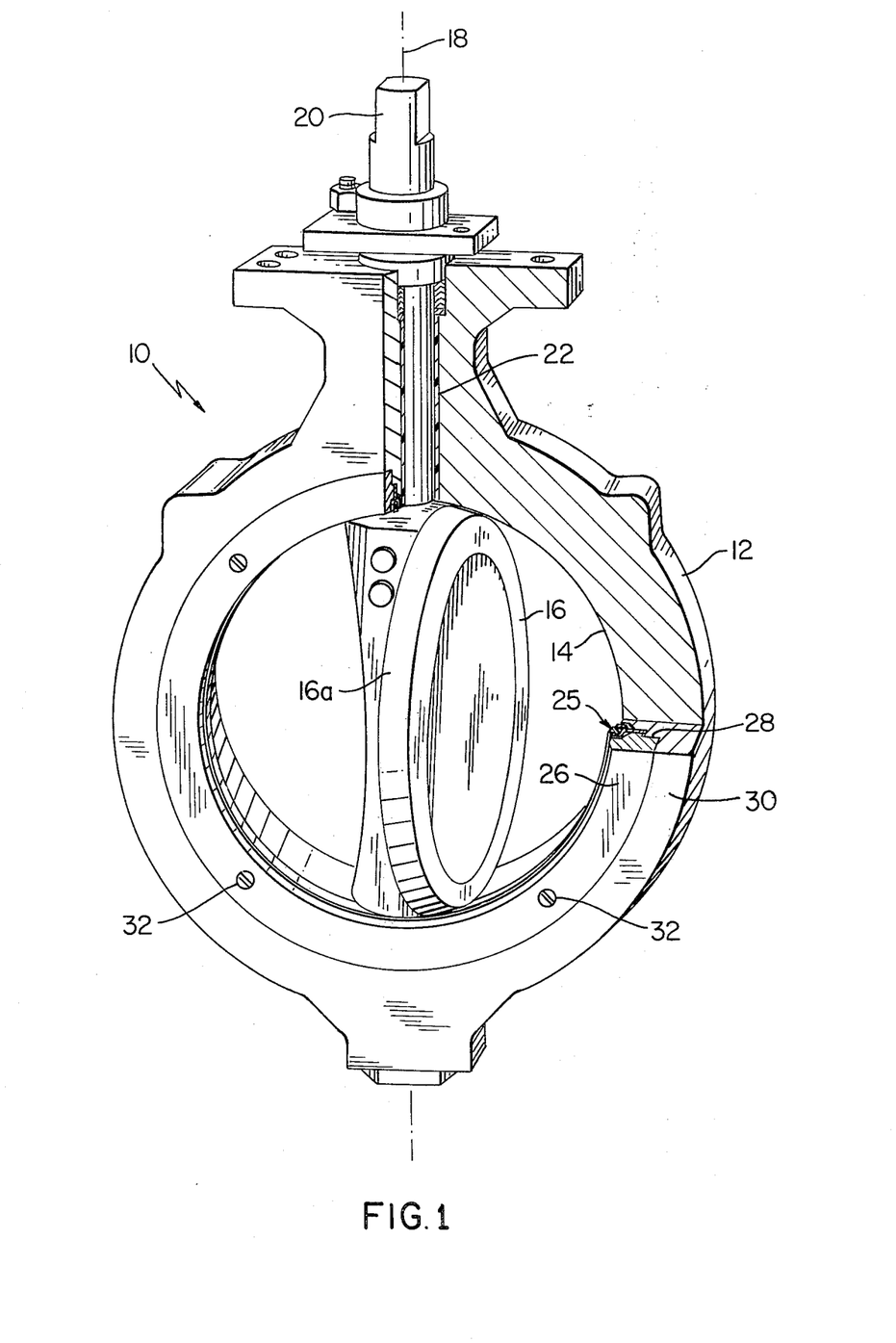
FIG. 1 is a perspective view of a high performance butterfly valve taken from the retaining side of the valve with a portion of the retainer seat removed, illustrating one form of the valve and valve seat of the present invention.

Turning now to the drawings and to FIG. 1 in particular, a butterfly valve generally designated by the numeral 10 illustrating one form of the present invention is shown in an open position. The valve 10 has a body 12 of a wafer design which contains a centrally disposed bore 14. A closure member, shown as a disc 16 with a spherical sealing surface 16a about its periphery, is pivotally mounted in the bore 14 about an axis 18 which is substantially perpendicular to the axis of the bore 14. The disc 16 is pivotally moved about axis 18 to open and close the valve 16 in a manner well known in the art. As clearly shown in FIG. 1 and as will be explained in more detail later, the disc 16 is mounted onto the outer surface of the shaft 20 which is rotatable about the axis 18. Since the shaft 20 has a finite diameter, the disc 16 mounted on the shaft's outer surface is offset from the axis 18 and eccentrically mounted with respect thereto. The shaft 20 extends completely through the bore 14 and through the body 12. An operator (not shown) is connected to one end (the top end) of the shaft 20 to impart rotation to both the shaft 20 and the disc 16 to close and open the passageway through bore 14. Suitable anti-friction means such as a sleeve bearing of self lubricated woven-oriented polytetrafluoroethylene (polytetrafluoroethylene is sold under the trademark TEFLON) contained in a corrosive resistant steel cylinder 22 surround the shaft 20 and reduce friction, reducing the power required of an operator in effectuating rotation of the shaft 20 and disc 16 about the axis 18.

Although not clearly illustrated in FIG. 1, the disc 16 is also eccentrically mounted in a direction perpendicular to the axis 18 so that two eccentricities are present. In other words, the disc 16 is both offset and eccentric in a manner which is also known in the art. This design gives a cam-like action to the disc movement as it is pivoted off center. The off centered disc design moves the disc 16 out of a seat 25 so that the two members 16 and 25 do not contact when the disc 16 is in the open position. This design avoids constant rubbing of the seat 25, excessive disc drag and seat deformation when the disc 16 is in the open position. The double eccentric design also provides axial movement at the final moment of closure to preload the seat 25 of the present invention. This type of design is particularly advantageous for use with the present invention since once the disc 16 experiences twenty to thirty degrees of opening, contact between the disc 16 and the seat 25 is terminated. Further opening of the disc 16 will not cause wear of the seat 25 and may be had at a reduced operating torque. However, inasmuch as the off center design heretofore described is old in the art and forms no part, per se, of the invention, further description thereof will be omitted in the interests of brevity.

A retainer ring 26 is shown fitted in a recess 28 on the face 30 of the body 12 and is secured by suitable fastening means, specifically illustrated as screws 32.

The valve seat member 25 is of generally cylindrical configuration and secured into the annular groove or recess 28 (more clearly illustrated in FIGS. 2-4) circumscribing the bore 14, which recess 28 is jointly formed by a section of the body 12 and an internal mating surface of the retainer ring 26. As shown in FIG. 1 and as will be explained more fully subsequently in relationship to FIGS. 2-4, the valve seat member 25 extends radially inward from the annular groove 28 toward the radial center of the bore 14. The annular recess 28 is radial alignment with the peripheral spherical sealing surface 16a of the disc 16 when the valve 10 is in the closed position.

Figure 2:
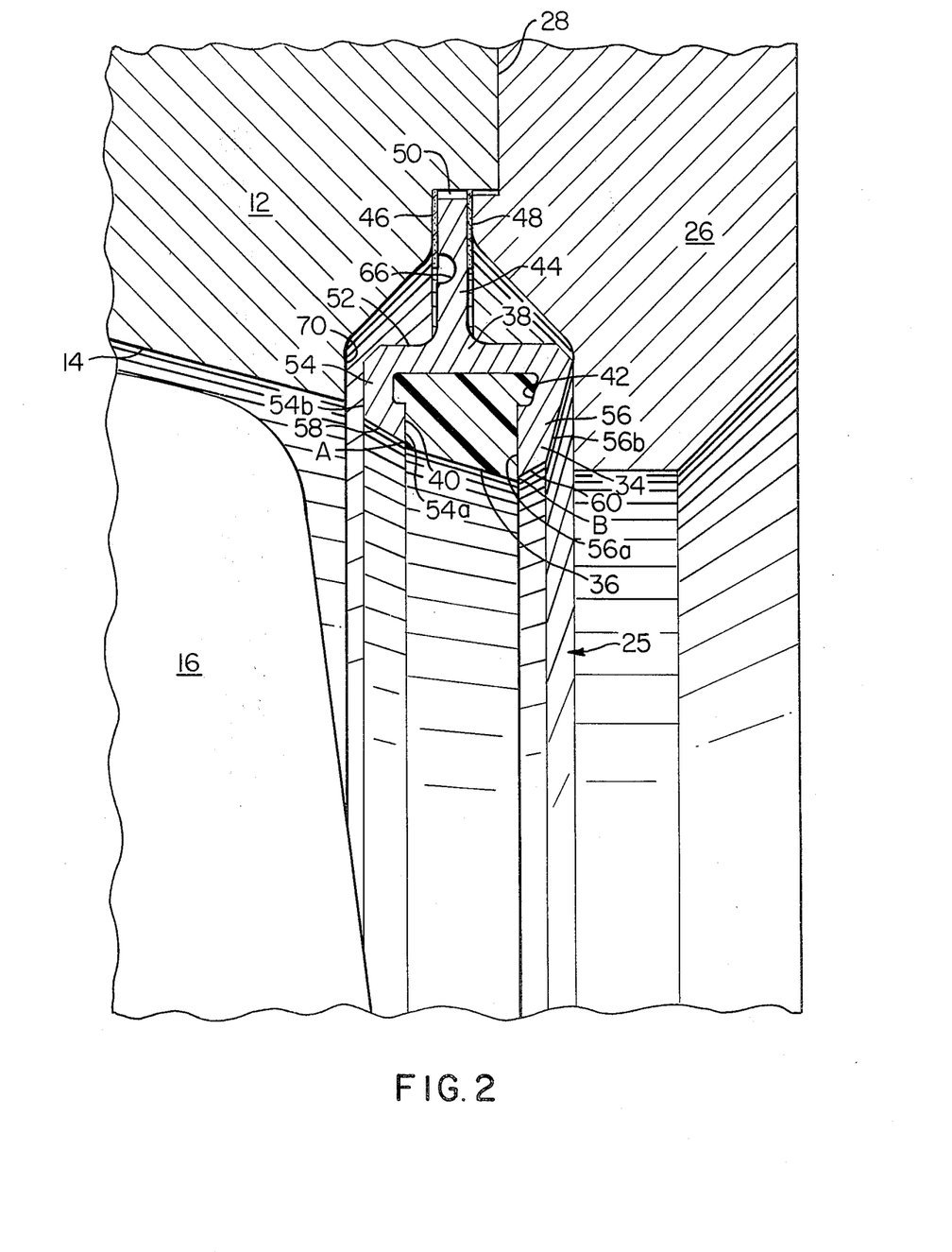
FIG. 2 is a sectional view taken through the valve seat of FIG. 1 illustrating the valve seat of the preferred embodiment in a relaxed position with the disc closure member in a partially open position.

Turning now to FIG. 2, the seat member 25, retainer ring 26, valve body 12, and disc 16 of the valve 10 illustrated in FIG. 1 are shown in cross-section and in greater detail. It is seen that the seat member 25 includes two separate parts, a grooved metal seat portion 34 and a soft seat insert portion 36. The metal seat portion 34 includes metal seat ring 38 which, in the preferred embodiment, is machined from corrosion resistant stainless steel. Certain other materials such as, for example, a nickel alloy sold under the trademark INCONEL might also be used. INCONEL material has a greater elasticity of resiliency than stainless steel and can also be used at higher temperatures without losing its elasticity. The soft seat insert 36, on the other hand, may be machined out of plastic material such as polytetrafluoroethylene, or may be molded out of natural or synthetic rubber. Other types of suitable rubber-like materials such as plastics sold under the trademark KALREZ will be apparent to those skilled in the art. Alternately, the soft seat insert 36 may be machined out of a soft metal such as copper or the like. Whatever the material utilized, the soft seat insert 36 is snugly fitted into an annular groove 40 machined in the metal seat portion 38. Annular groove 40 has a flange 42 of increased axial dimension at its radial intermost portion. This flange 42 tends to secure the soft member 36 against dislodgement from the metal seat ring 38 under the impetus of fluid media pressure within the valve 10.

The metal seat portion 34 consists of a vertically disposed annular flange 44 which is compressingly secured or clamped on its outermost radial end between the valve body 12 and the seat retainer 26. Since the vertical flange 44 is constructed of stainless steel or other metal, axially extending retaining flanges are not required to securely hold the seat 25 to the valve body 12 and seat retainer 26. Unlike a soft seat material which might be radially distorted and expelled by fluid pressure within the valve, the metal used in seat portion 34 has sufficient structural integrity as to resist radial distortions from the fluid pressure. Thin graphite gaskets 46 and 48 are axially interposed between the valve body 12 and the vertical flange 44 and the seat retainer 26 and vertical flange 44. These graphite gaskets 46 and 48 are optional and serve to fill in uneven areas between the metal flange 44, valve body 12 and seat retainer 26 that result from machining irregularities. The graphite gaskets 46 and 48 provide "bubble tight" shut-off seals, one of the graphite gaskets 46 providing a seal between the valve body 12 and one axial side of the metal flange 44 while the other graphite gasket 48 provides a seal between the seat retainer and the opposite axial side of the same metal flange 44. For reasons which will be described more fully below, an annular space or alignment gap 50 is provided between the radial intermost surface of the flange 44 of the metal seat 34 and the valve body 12.

The annular vertical flange 44 extends radially inward from the clamping location into the bore 14 and terminates at the second or seat ring portion 38 of the metal seat 34, seat ring portion 38 having axial dimension substantially greater than that of the flange portion 44. This second or seat ring portion 38 of the metal seat 34 includes an axial extending top wall 52 which is axially extended on opposite sides of the first or flange portion 44 of the metal seat portion 34 and in generally perpendicular relationship to the flange 44. Axial side walls 54 and 56 of the metal seat ring 34 extend radially inward into the bore 14 from the opposite axial ends of the top wall 52. These axial side walls 54 and 56 together with the top wall 52, define the flange groove previously described for the soft seat insert material 36.

The soft seat insert 36 may be placed into the flange groove 40 of the metal seat portion 34 by one of several different methods. One method would be to force the soft seat insert 36 into the flanged slot 40 under pressure by a roller (not shown). A second and alternative method would be to machine the flange slot 40 to a width greater than the width of the soft seat insert 36. Under this second method, the soft seat insert 36 would be placed into the machined groove 40 and one or both of the axial side walls 54 and 56 would be bent inwardly into intimate compressing engagement with the soft seat insert 36. A third and alternate method of placing the soft seat insert 36 into the flanged grooves would be to mold the soft seat insert 36 into a previously machined flanged groove 40. The flange 42 in the groove 40 of the metal seat portion 34 will protect the soft seat insert 36 against blow-out and leakage in high pressure applications when it is inserted under any of the above described methods.

In FIG. 2, the illustrated valve seat is shown in a relaxed or free state position with a closure disc approaching a closed position. From this view, as well as from FIGS. 3 and 4, it is seen that the internal surfaces 54a and 56a of the axial side walls 54 and 56 extend radially inward for predetermined distances and that the external surfaces 54b and 56b of these same axial side walls extend radially inward for distances less than the radial extensions of internal surfaces 54a and 56a. The radial ends 58 and 60 of the axial groove defining side walls 54 and 56 are obliquely oriented to converge toward the groove 40, connecting surfaces 54a and 54b on axial side wall 54 and surfaces 56a and 56b on axial side wall 56. The interface of the interior sides 54a and 56a and the radial ends 58 and 60 form two sharp points A and B.

Figure 3:
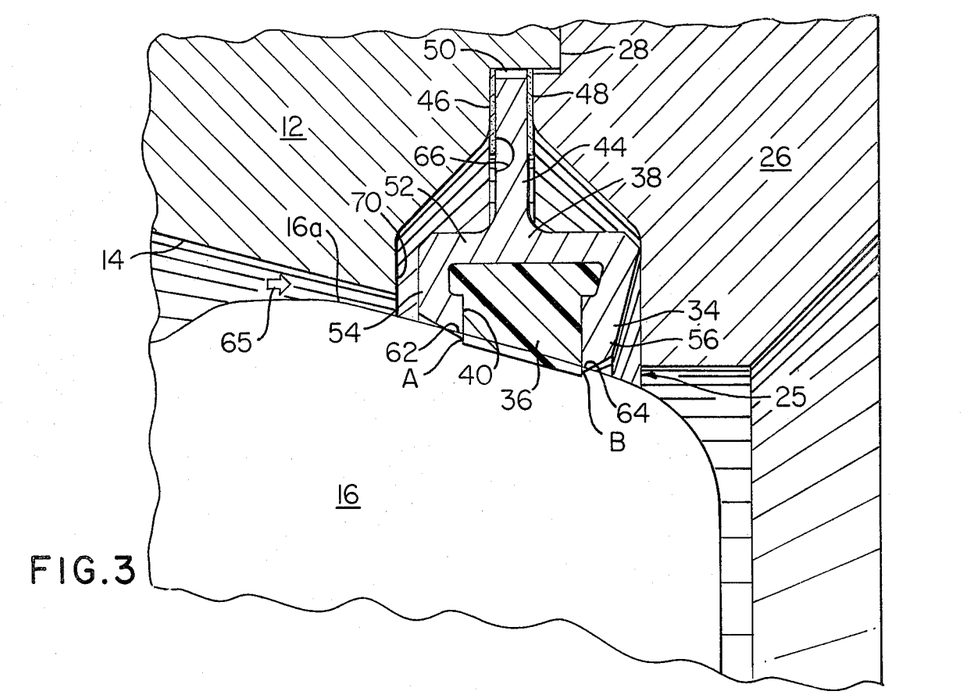
FIG. 3 is a sectional view, similar to FIG. 2, depicting the valve seat of FIGS. 1 and 2 and showing the relationship of the disc and its adjacent elements when the disc is in a fully closed position and the disc is subjected to axial fluid pressure from the body side of the valve.

FIG. 3 illustrates the valve seat 25 of FIG. 2 after the closure disc 16 has been moved to the fully closed position. As initially formed, the metal seat ring portion 34 of the metal seat 25 has an internal radial dimension which is less than the corresponding radial dimension of the disc 16. Consequently, as the disc 16 is initially moved to the fully closed position, points A and B of the seat ring 34 are permanently deformed by the resulting interface forces with the disc 16. As shown in FIG. 3, the portions of points A and B extending below the line representing the top of the disc sealing surface 16a will be flattened and permanently deformed by the closure of the disc 16. The resulting structure of the deformed axial side walls 54 and 56 would be a truncated triangular section having an interface surface with the disc 16 corresponding substantially to the intersections of the disc 16 with the metal seat 25 illustrated in the drawings, which intersections are indicated as surfaces 62 and 64 in FIGS. 3 and 4. Permanently deforming the metal seat ring 25 with the disc 16 with which it will operationally cooperate when the valve 10 is in use permits precise sizing of the metal seat ring 34 to the size of the disc 16 without undergoing expensive griding or lapping procedures. This type of precision or custom sizing of the seat 25 may be accomplished in at least two different ways. First, the valve could be assembled with the disc 16 in an open position and the retainer 26 fastened securely to the valve wall by the screws 32, the retainer 26 securing the valve seat 25. As seen in FIG. 2, the metal seat ring 34 is in contacting engagement with the seat retainer 26 in the initial and relaxed position. Consequently, when the disc 16 is initially closed with the valve 10 so assembled, the seat retainer 26 prohibits further axial movement (to the right in FIGS. 2-4) of the metal seat ring 34 and the interface force with the disc 16 permanently deforms the points A and B.

An alternative, and perhaps preferred, method of deforming points A and B is to move the disc 16 into a closed position prior to installation of the seat 25. The seat 25 is then placed upon the oversized disc 16 with the retainer 26 placed adjacent and concentric to the seat 25. Screws 32 holding the seat retainer 26 to the valve body are then axially advanced to then force the metal seat ring 34 over the oversized disc 16. In addition to permanently deforming the points A and B and precisely sizing the metal seat 25 to the disc, this latter described method permits radial shifting of both the metal seat 34 and the seat retainer 26. The alignment gap 50 circumscribing the radial outermost portion of the flange portion 44 of the seat 25 accommodates such radial shifting of the metal seat 34 and allows the seat 25 to radially align itself to the disc 16. Allowing the seat 25 to shift radially by virtue of the alignment gap 50 also helps in minimizing the amount of interference. The use of such an alignment gap 50 also permits some radial movement of the seat 25 even when the seat 25 is clamped by the retainer 26 and points A and B are permanently deformed in accordance to the first method described above. An alignment gap 50 as previously described is particularly useful in securing a precision fit between the metal seat ring 34 and the disc 16 as it allows some imprecision in the manufacture of the components and does not required round, prefctly concentric parts.

The soft seat insert 36 will be formed of a material having sufficient inherent resiliency that it will not be permanently deformed in the above described methods of deforming points A and B of the middle seat ring. Suggested soft materials are discussed above.

As also noted above, the radial intermost surfaces 58 and 60 of the metal seat ring's (34) axial side walls 54 and 56 are converged toward the groove 40 to form the two points A and B. These points A and B are intentionally made very sharp initially in order to keep the required disc closing force or tightening forces on the retainer 26 to a minimum. A still further and important advantage that results from initially forming the points A and B as sharp points is that once the points A and B are permanently deformed, the resulting interface surfaces 62 and 64 with the disc 16 are reduced in area, a factor that also reduces the operating torque required of the valve 10.

The convergence of the radial intermost ends 58 and 60 of the axial side walls 54 and 56 of the metal seat 25 toward the soft seat insert groove 40 is also advantageous because it facilitates the necessary radial stretching of the seat 25 that inherently results from permanently deforming the points A and B. Applicant has found that increased axial width of the seat interface to be deformed results in increased radial stretching of the remainder of the seat 25 during the deformation. With increased radial stretching there is greater possibility that the metal seat 25 will be stretched beyond its elastic limit. Although the disc 16 and seat 25 might initially be sized within close tolerances so as to avoid this problem, as for example by lapping, such procedures are costly. By use of these sharp points A and B, the tolerances between disc and seat sizes may be increased dramatically without concern that the metal seat 25 will stretch beyond its elastic limit.

To additionally reduce the operating torque required to open the disc 16, a low friction coating or lubricant is applied to the sealing surface of the disc 16 in a manner in which coating is actually embedded into the microstructure of the disc material. Embedding the coating or lubricant into the microstructure, which is done by a commercially available process, constantly lubricates the surface of the disc for many operating cycles. Merely applying lubricant to the disc's sealing surface 16a without embedding it into the microstructure will result in removal of the lubricant, both from friction after a relatively few operating cycles and by the media flowing through the valve.

Figure 4:
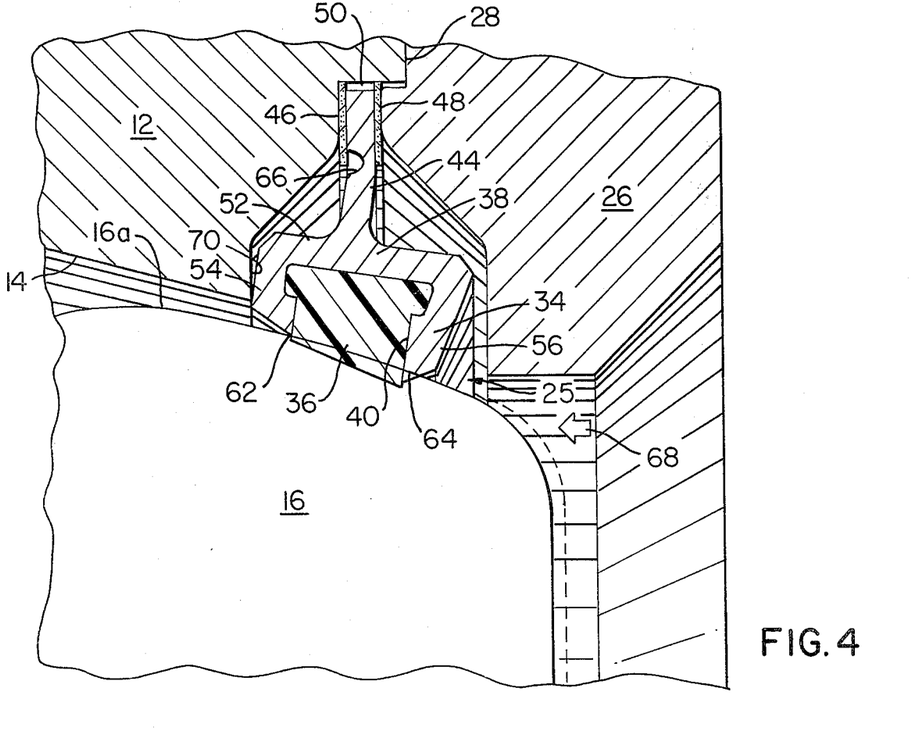
FIG. 4 is a sectional view, similar to FIGS. 2 and 3, depicting the valve seat of FIGS. 1-3 when the disc is in a closed position and subjected to axial fluid pressure from the retainer side of the valve.

Normally, when fluid pressures are introduced into the valve 10 from the body side, the disc 16 has a tendency to deflect in the direction of pressure as indicated by arrow 65 (to the right in FIGS. 2-4). However, since the metal seat 25 has substantial structural rigidity and is already compressed between the disc 16 and the seat retainer 26, the structural rigidity of the metal ring 34 strongly resists further deflection by the disc 16. Moreover, pressure in this direction or any further deflection of the disc 16 in this direction will result in a higher contact pressure between the seat assembly 25 and the sealing surface 16a of the disc 16.

As should be readily apparent from the viewing of any one of the FIGS. 2-4, the vertical flange portion 44 of the metal seat 25 has an annular notch 66 positioned intermediate of the clamping location to the body 12 and seat retainer 26 and the ring portion 34 of the metal seat 25. This notch 66 is preferably made on the vertical flange 44 during the machining process and is tuned to the expected pressure range of the valve 10. Its position, relative to the clamping area and ring insert 36, is selected to effect axial flexure of the metal seat 25.

Axial flexure of the metal seat 25 is illustrated in FIG. 4. This type of flexure is effectuated under the impetus of media pressure from the retainer side of the valve 10. Pressure from this direction is schematically illustrated in FIG. 4 by arrow 68. High media pressure from the retainer side of the valve will deflect the disc to the left in FIG. 4. This flexure of the metal flange 44 will permit the metal seat ring 34 to follow the disc 16 deflection. Excessive bending of the vertical flange 44 is prevented by the proper placement of the valve body forming the left side wall 70 of the annular groove 28. The spacing of the left side 70 of the groove from a relaxed or free state position of the metal seat 25 is so selected so as to accommodate maximum disc 16 deflection.

When the disc 16 deflects to the left side, as illustrated in FIG. 4, there is a tendency for the larger spherical surface 16a, which is in contact with the seat 25, to be taken out of this contacting relationship. If the seat 25 were not permitted to follow the disc 16, leakage between the seat 25 and the disc 16 would result. It is noted that when media pressure from the body side of the valve 10 is experienced (from the left side of FIGS. 2-4), the opposite is true. Pressure from the body side of the valve 10 tends to tighten the seal, because the sealing surface 16a of the disc 16 is spherical. A corollary consequence of this relationship is that a greater operating torque will be required to open the disc 16 when media pressure is applied from the body side of the valve 10 than when media pressure is applied from the retainer side of the valve 10. It also follows that axial type flexure of the valve seat 25 such as that provided by the disclosed embodiment is necessary in only one direction, i.e., flexure to the left in FIGS. 2-4 as specifically illustrated in FIG. 4. Flexure to the right is not necessarily required.

In the illustrated embodiment, only unidirectional axial flexure of the valve seat 25 is permitted, flexure toward the valve body side as depicted in FIG. 4. Axial flexure to the right is prohibited by the seat retainer 26 which is in engaging contact with the seat 25 while the seat 25 is in a relaxed or free state position, such as the position depicted in FIG. 2. This contacting relationship with the seat 25 is necessary to permanently deform points A and B. If zero clearance between the seat 25 and fully positioned seat retainer were not provided, either the initial disc 16 closure to deform points A and B or the axial tightening of seat retainer screws 32 would result in axial flexure of the seat 25 toward the seat retainer 26 (toward the right in FIGS. 2-4). It would be possible, however, to use a first seat retainer 26 to deform points A and B during assembly and to thereafter use a different seat retainer (not shown) which would permit axial flexure of the seat toward the retainer side. While a valve permitting such axial seat flexure toward the retainer side of the valve may be desirable under certain circumstances, when a metal seat is used, axial flexure of the seat 25 in both directions may increase the possibility of fatigue of the vertical flange 44.

Although the valve seat of the preferred embodiment is designed to axially flex about a notch, it may be desirable to axially flex the seat under media pressure without such an annular notch. However, the presence of such a notch will greatly enhance such flexure. A notch 66, such as in the illustrated embodiment, can be used to effectuate axial flexure at a specific location. Normally, a cantilever type of valve seat 25, such as that illustrated, will have a maximum bending moment at the anchoring or clamping location, and bending would normally occur at that spot. The use of a notch 66 reduces the bending resistance at the notch 66 location to concentrate axial flexure at that location. The further the notch of the illustrated embodiment is located radially inward from the clamping location, the greater the media pressure required to flex the metal seat 25. Variability of the axial flexibility of the metal seat 25 can also be influenced with the depth of the notch 66, greater depths tending to increase the axial flexibility at specific locations. In the preferred embodiment, the annular notch 66 has a semi-circular cross sectional configuration. This configuration is chosen to reduce the stress concentration at the notch location. Although any notch 66 will inherently give rise to a localized concentration of stress due to the discontinuity it creates, the stress may be reduced by controlling the character of the continuity. A semi-circular notch, for example, creates stresses which are less than that of a V-shaped notch. In the illustrated embodiment, the notch 66 is matched on the valve body side of the flange 44 because the seat 25 is designed to flex in that direction.

In operation, when the illustrated valve 10 has its disc 16 moved to the closed position, three separate sealing relationships are established between the spherical sealing surface 16a on the disc 16 and the seat member 25. The points A and B will each have been permanently deformed to establish custom sized interface and sealing surfaces 62 and 64, and these surfaces 62 and 64 are in sealing relationship to the disc 16. The soft insert seat 36 forms a third sealing surface with the disc 16. Thus, not only are two separate metal-to-metal seals which are formed in a manner to improve the sealing relationship provided, but also, the soft seat insert 36 is resiliently deformed to establish a "bubble tight" seal for normal operation of the valve 10.

In the event of ultra-high temperatures, such as those which might result from a fire, the metal-to-metal seals at surfaces 62 and 64 would maintain their sealing relationship with the disc 16 even if the soft seat insert 36 were to vaporize or otherwise deteriorate. Thus, the disclosed valve 10 would be safe for use with flammable liquids.

Further, the operation of the valve 10 does not depend upon the elastomeric properties of any of its non-metal components and plastic materials, such as polytetrafluoroethylene, which are proven for use with a broad range of fluid medias, may be used. Consequently, the valve 10 components do not need to be media matched and inventory requirements of component parts may be kept at a minimum.

Also, the metal-to-metal sealing surfaces 62 and 64 are minimized by initially constructing points A and B as sharp points and thereafter permanently deforming those points to relative small sealing surfaces 62 and 64 which intimately engage and seal with the sealing surface 16a of the disc or closure member 16. Moreover, the size and configuration of these sealing surfaces 62 and 64 is precisely matched to disc 16 size and configuration in an efficient and economical manner. Moreover, the illustrated valve seat 25 which accomplishes all of these objectives is bi-directional and may be subjected to fluid pressure from either axial side of the disc 16.

Thus it is apparent that there has been provided in accordance with the invention, a valve and seat member therefor which satisfies the objects, aims and advantages set forth above. While the invention has been described in conjunction with a specific embodiment and specific procedures thereof, it is evident that many alterations, modifications, and variations will be apparent to those skilled in the art in light of the foregoing description. Accordingly, it is intended to embrace all such alternatives, modifications and variations as fall within the spirit and broad scope of the appended claims.

I claim:

1. A fire-safe valve, comprising:
   (a) a valve body having a bore therethrough;
   (b) a valve closure member mounted in said bore and movable between open and closed positions about an axis substantially transverse to said bore, said closure member having a peripheral sealing surface;
   (c) an annular recess circumscribing said bore and disposed in radial alignment with said peripheral sealing surface of said closure member when said closure member is in the closed position;
   (d) a seat member adapted to selectively interface with said sealing surfaces of said closure member supported in said annular recess and extending radially inward therefrom, said seat member including:
      (i) an annular metal flange secured to said valve body and extending radially inward into said bore, said flange being pliant in at least one axial direction;
      (ii) a metal seat ring extending radially inward from said metal flange having an axial dimension which is substantially greater than the corresponding axial dimension of said metal flange, said metal seat ring having radially extending axial sidewalls which at least partially define an annular flanged groove within said seat ring, the radial end surfaces of said groove defining sidewalls being axially converged toward the groove; and
   (e) an annular sealing surface formed of material softer than the metal of the metal seat ring snugly fitted within said annular flanged groove, said sealing surface of softer material extending radially beyond the radial extension of the metal seat ring and being resiliently radially deformable to a position corresponding to the radial extension of the axial sidewalls of said metal seat ring under the influence of an interface force with the closure member.

2. A fire-safe valve as recited in claim 1 wherein the radial end surfaces of said groove defining sidewalls have been radially stretched by the closure member and the axial sidewalls permanently deformed thereby to a size and configuration corresponding to the size and configuration of said closure member.

3. A fire-safe valve as recited in claim 2 wherein said softer material is non-metallic.

4. A fire-safe valve as recited in claim 3 wherein said softer material is formed of a fluorinated hydrocarbon polymeric material.

5. A fire-safe valve as recited in claim 4 where said fluorinated hydrocarbon polymeric material is polytetrafluoroethylene.

6. A fire-safe valve as recited in claim 3 wherein said metal flange and said metal seat ring are formed of a stainless steel.

7. A fire-safe valve as recited in claim 3 wherein said metal flange and said metal seat ring are formed of a nickel alloy.

8. A fire-safe valve as recited in claim 3 wherein said metal flange is compressingly engaged upon the axial sides of its radially outermost portion between the valve body and a seat retainer member.

9. A fire-safe valve as recited in claim 8 wherein an alignment gap is formed between the outermost axial end of the annular metal flange and one of the valve body as the seat retainer.

10. A fire safe valve as recited in claim 8 wherein said metal flange has an annular notch intermediate the portion compressingly engaged between the valve body and the seat retainer and the metal ring portion, said annular notch serving to concentrate any axial flexure of the seat member at the notch location.

11. A fire-safe valve as recited in claim 10 wherein said annular recess includes axial sidewalls formed by said valve body and the seat retainer, and said seat member in the free state is in contacting relationship with at least one of said axial sidewalls and axially spaced from the other axial sidewall, the seat member being axially flexible only toward the other axial sidewall.

12. A fire-safe valve as recited in claim 11 further including seals between the valve body and the seat retainer and the portions of the metal flange compressingly engaged therebetween.

13. A valve, comprising:
(a) a valve body having a bore therethrough;
(b) a valve closure member mounted in said bore and movable between an open and closed position about an axis substantially transverse to said bore and having a peripheral sealing surface;
(c) an annular recess circumscribing said bore disposed in radial alignment with said sealing surface of said closure member when said closure member is in the closed position, said annular recess having axial sidewalls formed by said valve body and a seat retainer; and
(d) a seat member supported in said annular recess and extending radially inward, said seat member including a metal flange portion secured to said valve body and a metal seat ring supported on the radial inward portion of said flange adapted to selectively interface with said sealing surface of said closure member, said metal seat ring including an axial extending topwall in generally perpendicular relationship to said flange and a pair of axial sidewalls extending from said topwall, said topwall and said axial sidewalls defining an open sided annular groove within the seat ring, said seat member being in contacting relationship with at least one of said axial sidewalls and being axially spaced from the other axial sidewall in the free state, the seat member being axially flexible only toward the other axial sidewall.

14. A valve as recited in claim 13 wherein said flange has an annular notch on the axial side distal to the contacting sidewall.

15. A valve as recited in claim 14 further including a seat retainer releasably secured to said valve body, said seat retainer cooperating with said valve body to form said annular recess, said flange being compressingly engaged at its radially outermost portion between said valve body and said seat retainer and said annular notch being disposed between the compressed radially outermost portion of the flange and the metal seat ring.

16. A valve as recited in claim 15 wherein said open side annular groove has an axially extending flange on its radial intermost portion.

17. A valve as recited in claim 16 wherein the radial intermost ends of the axial sidewalls are converged toward said open side annular groove.

18. A valve as recited in claim 17 wherein the radial intermost ends of the axial sidewalls are permanently deformed to a size and configuration established by said closure member, said permanent deformation resulting from radial stretching of said seat ring with said closure member.

19. A valve as recited in claim 18 further including an annular sealing surface of fluorinated hydrocarbon polymeric material is fitted with said open sided annular groove.

20. A valve as recited in claim 19 wherein said metal flange and said metal seat ring are formed of stainless steel.

21. A valve seal, comprising: a metal seat adapted to fit in a valve body and extend into a centrally disposed opening thereof in a first predetermined direction for selective and cooperative interfacing with a movable closure member, said metal seat including a first axial surface extending in the first predetermined direction for a predetermined distance, a second axial surface extending in said predetermined direction for a distance less than said predetermined distance, and a third surface connecting said first and second axial surfaces, the interface of said first and third surfaces having been permanently deformed by a movable closure member to provide a precisely sized contact surface adapted to sealingly engage a movable closure member.

22. A valve, comprising:
(a) a valve body having a bore therethrough;
(b) a valve closure member mounted in said bore and movable between an open and closed position about an axis substantially transverse to said bore, said valve closure member having a peripheral sealing surface;
(c) an annular recess circumscribing said bore and disposed in radial alignment with said sealing surface of said closure member when said closure member is in the closed position;
(d) a seat member supported in said annular recess and extending radially inward, the radial intermost portion of said seat member being permanently deformed by radial stretching from interfacing with the closure member to a size and configuration established by said closure member, said seat member being adapted to selectively sealingly interface with said sealing surface of said closure member;
(e) a seat retainer releasably secured to one axial side of said valve body, said seat member having a radially outward extending flange which is axially compressed between the valve body and the seat retainer when the seat retainer is secured to the valve body; and
(f) an annular radial alignment gap between the radial end of said seat member and one of said valve body or said seat retainer, said seat member being radially shiftable within the bore by virtue of said radial alignment gap as said seat retainer is secured to said valve body.

* * * * *